June 30, 1964     A. C. CUSTANCE ETAL     3,139,085
METHOD FOR DETERMINING SWEAT RATE Filed Sept. 2, 1960     3 Sheets-Sheet 1

June 30, 1964   A. C. CUSTANCE ETAL   3,139,085
METHOD FOR DETERMINING SWEAT RATE
Filed Sept. 2, 1960
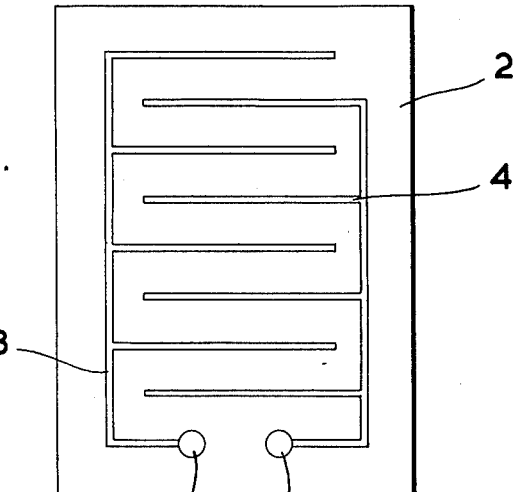
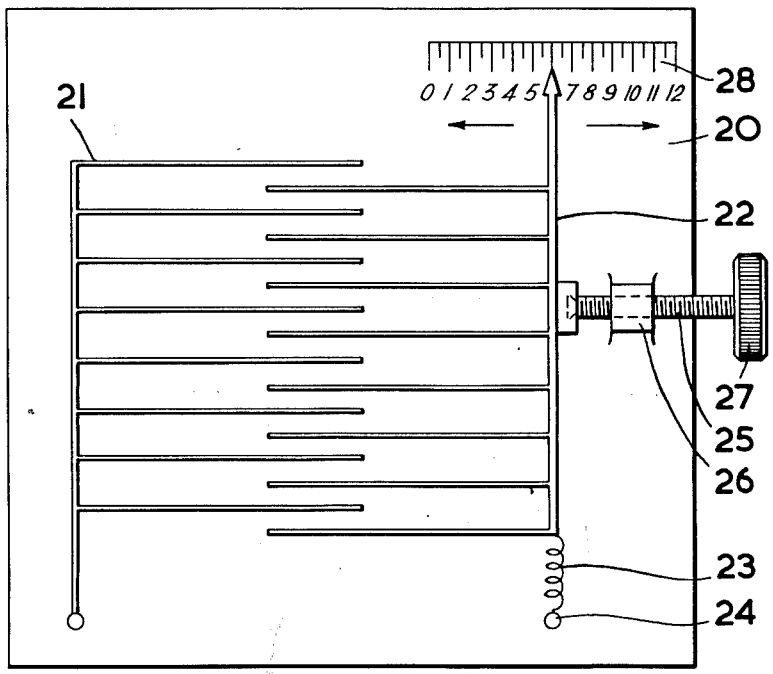

June 30, 1964 A. C. CUSTANCE ETAL 3,139,085
METHOD FOR DETERMINING SWEAT RATE
Filed Sept. 2, 1960 3 Sheets-Sheet 2

Inventors:
Arthur C. Custance
Orest Z. Roy
By Kenmon, Palmer & Stewart
Attorneys

United States Patent Office 3,139,085
Patented June 30, 1964

3,139,085
METHOD FOR DETERMINING SWEAT RATE
Arthur C. Custance and Orest Z. Roy, Ottawa, Ontario, Canada, assignors to Her Majesty the Queen in right of Canada, as represented by the Minister of National Defence
Filed Sept. 2, 1960, Ser. No. 53,694
Claims priority, application Canada Sept. 2, 1959
3 Claims. (Cl. 128—2)

This invention relates to a sweating rate indicator by means of which it is possible to detect sweating or changes in the rate of sweating immediately at the general body surface of an animal or at some specific portion thereof. The sweating rate indicator of the invention is primarily intended for use in measuring the rates of sweating of human beings but may also be applied to any sweating animal.

Various indexes of physiological stress have previously been proposed. However, some of these are not simple enough to be used in a field situation whereas others which might be so used are often difficult to interpret meaningfully. Thus, pulse rate is greatly influenced by the position of the subject. A safe pulse rate for a man standing would be a dangerous rate for a man lying inactive and a safe pulse rate for a man exercising actively could be dangerous in an inactive but standing subject. Oral temperature is difficult to evaluate particularly when the subject is breathing very heavily and through the mouth. Rectal temperature presents problems in that slight changes of position of the thermometer will give altered readings, and there may be a lag in response. Breathing rates may or may not indicate excessive stress. Thirst is not found to be a safe index of dehydration except possibly at subsequent meal times. Urine analysis for the detection of concentrations of waste products is useful but obviously slow and inconvenient except in a laboratory situation. Subjective feelings are notoriously unreliable. Skin temperature is difficult to assess and may require up to fifteen readings taken simultaneously at different places to give an overall picture. $CO_2$ analysis of exhaled breath is also cumbersome and clearly a laboratory technique.

We believe that the sweating rate is the best single index of stress and that it is certainly superior to the other indexes mentioned above. However, a prime difficulty involved in making use of the sweat rate as an index of stress lies in the problem of measuring the rate of sweating at any given moment as well as producing a continuous record of the fluctuations in sweat rate. In the past, instantaneous sweat rates could not be accurately determined and only very coarse measurements could be achieved.

It is an object of the present invention to provide a sweating rate indicator by means of which the rate of sweating or a change in the rate of sweating can be determined immediately and without undue inconvenience to the subject.

Accordingly, the invention provides a sweating rate indicator comprising an enclosure having an open end adapted to be applied to the skin of an animal, means for passing gas through said enclosure, and a sensing element consisting of a humidity-sensitive electrical resistance element within said enclosure.

When the device of the invention is applied to the skin of a subject the atmosphere within the enclosure tends to become more humid, because of the accumulation of water vapour in the air of the enclosure which is prevented from escaping. This has the effect of reducing the electrical resistance of the sensing element disposed within the enclosure. The more humid the atmosphere within the enclosure, the lower the electrical resistance of the element. By connecting an ohmmeter across the electrical resistance there is provided a means of indicating the changing of humidity within the enclosure. This procedure is satisfactory up to the point where the air becomes saturated. The instrument then ceases to function as a sweat rate indicator. This difficulty may be overcome by maintaining the air at a relative humidity lower than saturation but greater than zero by the accurately regulated passage of dry gas, normally air, through the enclosure. Any change in humidity is immediately compensated by an increased or decreased flow of gas which maintains the relative humidity at a constant level so that the rate of flow of gas is a direct measure of the rate of sweating. A continuous record of the rate of flow of gas thus provides a continuous record of sweat rate. The regulation of the flow of dry gas may be performed by hand.

The sensing element advantageously comprises a sheet of electrically non-conductive material, for example of synthetic resin, on which is printed a diagram of electrically conductive material normally of metal such as copper. The shape and form of the diagram may be modified in accordance with prevailing requirements. It has been found satisfactory to use an element of this type with a diagram comprising two interlocking but not electrically continuous grids. The high resistance of a dielectric material, which may be synthetic resin, is interposed between the interlocked arms of the grids or sensing system. An electrically stabilized source of current is imposed across the arms of the grid system and a means of measuring the flow of current is interposed in the circuit. When moisture is present in the air in the inclosure, the resistance of the dielectric between the arms of the grid decreases and hence a small electrical current will flow across the grid. This change in resistance or flow of current may be measured by a sensitive ohmmeter or ammeter respectively and is a direct measure of the relative humidity of the air in the enclosure. As the relative humidity increases the resistance across the grid falls and the current increases. It is therefore feasible to select a specific resistance or flow of current as a datum or reference and to regulate the flow of gas to maintain the current in a steady state. Water vapour in the air of the enclosure and adsorbed on the surface of the synthetic resin, between the interlocked but electrically disconnected arms of the grid system, reduces the resistance and allows a small current to flow which is proportional to the conductivity of the path and hence to the amount of conducting substance, water or water vapour, present. Dry gas or air flowing through the enclosure is normally regulated to maintain the resistance of the dielectric at a fixed level. In certain cases however the flow of gas may be fixed and the rate of increase or decrease or relative humidity in the box may be measured from the decrease or increase in resistance across the element. This situation applies particularly when the rate of sweating is normally decreasing as in sleep or under anaesthesia. The "depth" of unconsciousness is then reflected in the drop in relative humidity in the box and the corresponding rise in resistance across the element.

Where repetitive use of the sensing elements contained in the enclosure is required it is desirable to use corrosion resistant metals for the electrical grid or to plate the grid with a substance which resists corrosition, such as gold, platinum or similar metals. It has also been found that the air flow can be held constant, and a specially constructed variable grid element used as the sensing element, in which case the adjustment of the grid serves as the index of sweat rate.

Preferably this variable grid element comprises a sheet of electrically non-conductive material to which is permanently applied a first grid of electrically conductive material, this first grid being in interlocking relationship with a second grid of electrically conductive material and the second grid being movable relative to the sheet of electrically conductive material while still held in contact therewith. Movement of this second grid changes the electrical resistance of the sensing element.

The invention will be described by way of illustration and without limitation with reference to the accompanying drawings in which:

FIG. 4 shows a sweating rate indicating system embodying the device of FIG. 1.

Figure 1:
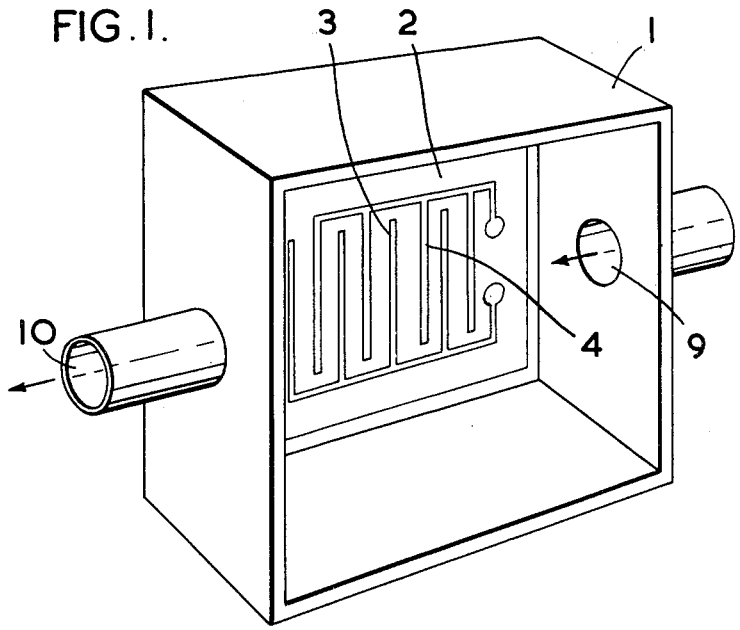
FIG. 1 shows a sweating rate sensing element in an enclosure.
Figure 3:
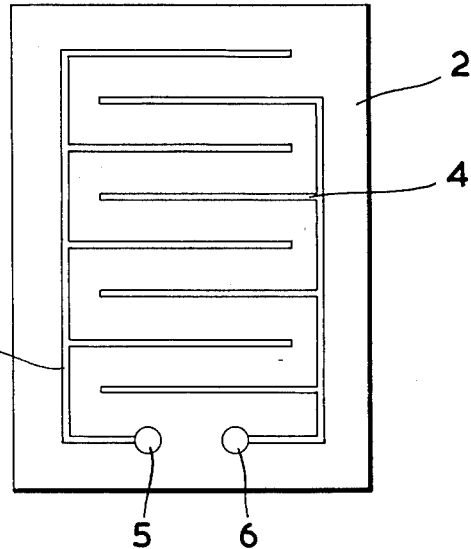
FIG. 3 shows a sensing element.

The sweating rate sensing element of FIG. 1 comprises a box 1 which is about ⅜" deep and has a cross sectional area of about 3 square inches. Mounted inside the box 1 is a sheet 2 of a plastic which does not absorb moisture, and is electrically non-conductive. On the sheet 2 there are printed two interlocking but not electrically continuous grids 3 and 4 of electrically conductive material as shown in FIG. 3. As shown in FIG. 3 the grids 3 and 4 are provided with terminals 5 and 6 respectively. The spacing and form of the two grids 3 and 4 may be modified in accordance with the use to which the instrument is to be put and the level of sensitivity required.

Figure 2:
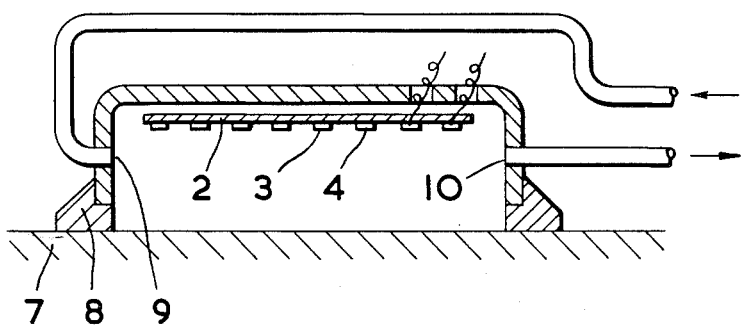
FIG. 2 shows a sweating rate sensing element and enclosure in section.

FIG. 2 shows the sweating rate sensing element applied to skin surface 7. For the purpose of insuring an air tight fit against the skin the indicator is provided with a rubber gasket 8 (FIG. 2) which for clarity is not shown in FIG. 1. As seen in both FIGS. 1 and 2 the sweating rate sensing element is provided with an inlet 9 and an outlet 10 by means of which gas, normally dry air, can be passed through the enclosure.

FIG. 4 shows in detail an arrangement for passing dried air at a controlled rate through the sweat rate sensing element of FIG. 1. Air is applied from a suitable source by way of a control valve 11 the setting of which is indicated by a pointer 12 moving over a scale 13. From the valve 11 the air passes to a drier 14 containing any suitable desiccant, for example, concentrated sulphuric acid or silica gel. The dry air passes from drier 14 through the enclosure 1 and from there to a rotameter 15. From the rotameter 15 it passes to a moisture collection device 16 where the moisture which has been picked up during its passage through the enclosure 1 is removed by means of a desiccant, dry air being returned to the atmosphere at 17. The moisture collection device 16 is carried by one arm of a balance 18 so that it is possible to keep a continuous check on the weight of the collector device 16, and hence of the rate at which moisture is being withdrawn from the enclosure 1 by the air flowing through it. An ohmmeter 19 is connected to the terminals 5 and 6 of the humidity sensing element within the enclosure 1.

The arrangement of FIG. 4 gives very complete information as to what is happening within the enclosure 1. A suitable datum point is selected on the scale of the ohmmeter 19. Then, as the humidity rises within the enclosure 1 due to the sweating of the subject to whose skin the enclosure 1 is applied, the needle of the ohmmeter is returned to this datum point by suitable adjustment of the control valve 11. As the setting of the control valve 11 is changed the changing reading of the pointer 12 on the scale 13 provides a measure of the rate of change of humidity within the enclosure 1 and hence of the rate of sweating. The readings so obtained are of course on an arbitrary scale determined by the construction of the scale 13. If absolute values are desired, these may however be derived by taking continuous readings on the rotameter 15 and making continuous weighings of the moisture collection device 16. This provides a continuous check on the rate of flow of air through the enclosure 1 and the rate of removal of moisture from the enclosure 1. The information so obtained may be used to calibrate the scale 13 and then in subsequent operations the rotameter 15 and the moisture collection device 16 may be dispensed with.

Figure 5:
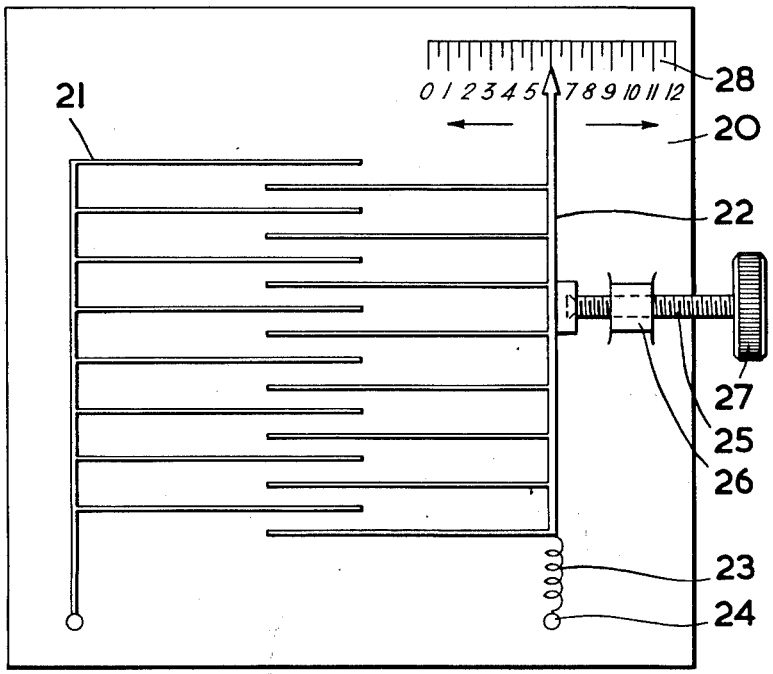
FIG. 5 shows a modified sensing element.

FIG. 5 shows a modified sensing element comprising a sheet 20, made of similar material to the sheet 2 of FIG. 1, a grid 21 permanently applied to the surface of the sheet 20 and a grid 22 arranged in interlocking relationship with the grid 21 but movable relative to the sheet 20. The grid 22 is held in contact with the surface of the sheet 20 under spring tension by means of a spring 23 which is anchored to the sheet 20 at 24. Movement of the grid 22 relative to the sheet 20 is accomplished by rotation of an adjusting screw 25 secured at one end to the grid 22. The adjusting screw 25 is mounted in a support 26 secured to the sheet 20 and carries at the end remote from the grid 22 a head 27. A scale 28 is printed on the sheet 20 so that the degree of movement of the grid 22 can be followed. When using the sensing element of FIG. 5 in a sweating rate indicator according to the invention, the rate of flow of gas is held constant and the electrical resistance of the sensing element is varied by movement of the grid 22 towards or away from the grid 21. The sensing element is made part of an electrical circuit, for example is connected to an ohmmeter, and the change of resistance of the sensing element, as measured on the scale 28, required to return an indicating instrument, for example the ohmmeter, to its datum point provides a measurement of the rate of sweating.

The rate of sweating of a given subject is related to both physical and mental activity. The sweating rate indicator of the invention can therefore be used for the determination or evaluation of both mental and physical stress in so far as they are reflected by an increase or decrease of sweating at the appropriate body locations by effecting continuing and rapid measurement of the sweating rate of a subject. The possibility of effecting a ready measurement of sweating rate should make possible various types of investigation. For example, it would facilitate the study of the physiological stress to which a person is subjected when he must wear impermeable clothing. This is of particular interest in connection with the provision of a combat soldier with a system of complete personal protection for example against bacteriological and chemical agents. Such a protective system may have to be totally enclosing and as a result the heat load will become a critical factor as soon as the immediate environmental temperature rises above skin temperature. The sweating rate indicator of the invention could be used for measuring the heat load imposed by such a protective system.

The indicator according to the invention would also find application in connection with evaluation of mental stress. It might be used for example to indicate levels of consciousness, to indicate dozing, and waking, to distinguish between feigned and real unconsciousness, to indicate blackout, and many other such applications. It may also be used to record periods of time slept (as in hospitals, etc.) and to guide an anaesthetist. Automatic regulation of anaesthetic might also be possible. There is also a possibility of determining the period of ovulation. It is emphasized that these remarks are given only by way of illustrating the possibilities of utilizing the sweating rate indicator of the invention; not all of these have been explored.

When using the indicator it is necessary to locate some small area of the body which can be used as an index of the whole body; since thermal sweating appears to be almost an all-over reaction, this offers no great difficulty.

When utilizing the instrument for the purpose of evaluating mental stress it is applied to the palms of the hands because it is in the palmar region that sweating, caused by mental stress, is most specific. In this context the term "palmar region" refers to those areas of the fingers and thumbs which are the usual points of contact when touching or holding an object. It is also found that the device will operate from the analogous area of the big toe.

We claim:
1. The method of measuring the rate of sweat from the surface of the body of an animal, including the steps of:
   (i) providing an aperture chamber,
   (ii) applying the aperture of said chamber to a selected area of said body, thereby subjecting a measured volume of air in said chamber to contact with said area,
   (iii) detecting the humidity present within said measured volume responsive to sweat from said area,
   (iv) passing dry air through said chamber at a rate such as to maintain said volume at a preselected constant relative humidity lower than saturation but greater than zero, and
   (v) measuring the rate of passage of said dry air to indicate the rate of said sweat.
2. The method of claim 1 wherein the detection of said humidity is achieved by humidity responsive means.
3. The method of claim 1 wherein the detection of said humidity is achieved by humidity responsive electrical means.

References Cited in the file of this patent

UNITED STATES PATENTS

| | | |
|---|---|---|
| 2,206,009 | Cummings | June 25, 1940 |
| 2,424,735 | Boothroyd | July 29, 1947 |
| 2,684,670 | Mathison | July 27, 1954 |
| 2,734,166 | Hooker | Feb. 7, 1956 |
| 2,812,757 | Lusk et al. | Nov. 12, 1957 |
| 2,943,245 | Ohlheiser | June 28, 1960 |

FOREIGN PATENTS

| | | |
|---|---|---|
| 804,421 | Great Britain | Nov. 12, 1958 |